(12) United States Patent
Zhang et al.

(10) Patent No.: US 10,946,390 B2
(45) Date of Patent: Mar. 16, 2021

(54) MAGNETIC MICROFLUIDIC CONCENTRATOR, INTELLIGENT MAGNETIC MICROFLUIDIC CONCENTRATOR, AND COMPLETE SET OF BENEFICIATION EQUIPMENT USING THE SAME

(71) Applicant: LONGI MAGNET CO., LTD., Liaoning (CN)

(72) Inventors: Chengchen Zhang, Liaoning (CN); Hengsheng Li, Liaoning (CN); Deliang Zheng, Liaoning (CN); Chao Wang, Liaoning (CN); Shixin Sun, Liaoning (CN); Dongfang Zhu, Liaoning (CN)

(73) Assignee: LONGI MAGNET CO., LTD., Liaoning (CN)

( * ) Notice: Subject to any disclaimer, the term of this patent is extended or adjusted under 35 U.S.C. 154(b) by 109 days.

(21) Appl. No.: 16/319,591

(22) PCT Filed: Apr. 18, 2018

(86) PCT No.: PCT/CN2018/083513
§ 371 (c)(1),
(2) Date: Jan. 22, 2019

(87) PCT Pub. No.: WO2019/085409
PCT Pub. Date: May 9, 2019

(65) Prior Publication Data
US 2019/0366354 A1    Dec. 5, 2019

(30) Foreign Application Priority Data
Nov. 3, 2017 (CN) .......................... 201711067728.6

(51) Int. Cl.
*B03C 1/28* (2006.01)
*B03C 1/30* (2006.01)
(Continued)

(52) U.S. Cl.
CPC ................ *B03C 1/286* (2013.01); *B03C 1/30* (2013.01); *B03D 1/001* (2013.01);
(Continued)

(58) Field of Classification Search
CPC ........... B03C 1/286; B03C 1/30; B03C 1/284; B03C 1/288; B03C 2201/18; B03C 1/32;
(Continued)

(56) References Cited

U.S. PATENT DOCUMENTS

2018/0185853 A1    7/2018   Zhang et al.

FOREIGN PATENT DOCUMENTS

| CN | 203076080 U | * | 7/2013 |
| CN | 205042606 U | | 2/2016 |

(Continued)

*Primary Examiner* — Waqaas Ali
(74) *Attorney, Agent, or Firm* — Novick, Kim & Lee, PLLC; Allen Xue

(57) ABSTRACT

An intelligent magnetic microfluidic concentrator employs a technique of feeding ores circumferentially and allowing tailings to overflow centrally upward. The intelligent magnetic microfluidic concentrator comprises a sorting system consisting of an ore feeding chute, an overflow chute, an overflow tank, a sorting tank, and a magnetic system, the overflow tank is disposed at an upper portion of the sorting tank, the ore feeding chute is disposed at the top of the overflow tank, the ore feeding chute feeds an ore slurry to the upper portion of the sorting tank circumferentially along an inner wall of the sorting tank, and the tailings overflow out upward from the overflow tank disposed centrally and located at the upper half portion of the sorting tank. A magnetic microfluidic concentrator and a complete set of beneficiation equipment are also provided.

14 Claims, 3 Drawing Sheets

(51) Int. Cl.
*B03D 1/001* (2006.01)
*B01D 21/00* (2006.01)

(52) U.S. Cl.
CPC .......... *B01D 21/0009* (2013.01); *B03C 1/284* (2013.01); *B03C 1/288* (2013.01)

(58) Field of Classification Search
CPC .......... B03C 1/02; B03D 1/001; B03D 1/028; B03D 2203/02; B03D 1/1456; B03D 1/1462; B01D 21/0009; B01D 2221/04; B01D 21/2416; B01D 21/2433; B01D 21/302; C22B 7/04
See application file for complete search history.

(56) References Cited

FOREIGN PATENT DOCUMENTS

| CN | 107649287 A | 2/2018 |
| CN | 207056767 U | 3/2018 |
| EP | 1616627 A1 | 1/2006 |
| WO | 2013151415 A1 | 10/2013 |

\* cited by examiner

_US 10,946,390 B2_

MAGNETIC MICROFLUIDIC CONCENTRATOR, INTELLIGENT MAGNETIC MICROFLUIDIC CONCENTRATOR, AND COMPLETE SET OF BENEFICIATION EQUIPMENT USING THE SAME

This application claims priority to Chinese Patent Application No. 201711067728.6, filed with the Chinese Patent Office on Nov. 3, 2017, entitled "Magnetic Microfluidic Concentrator and Complete Set of Beneficiation Equipment Using the Same", which is incorporated herein by reference in its entirety.

TECHNICAL FIELD

The present disclosure pertains to the technical field of magnetic separation, and in particular relates to a magnetic microfluidic concentrator, an intelligent magnetic microfluidic concentrator, and a complete set of beneficiation equipment using the same, belonging to novel intelligent electromagnetic separation equipment.

BACKGROUND ART

With the trend that the iron ore market is downturn in recent years or in long term and the oversupply of iron ore, improving a beneficiation process and reducing the production cost of iron concentrate powder have become urgent problems to be solved for all major beneficiation plants.

The reduction of the production cost of iron concentrate powder can now be achieved by exploiting high-grade raw ore or improving the beneficiation process. Since the mines in China are generally poor mines and there are very few rich mines in China, it is almost impossible for most beneficiation plants in China to exploit high-grade raw ores, thus the production cost of iron concentrate powder can only be reduced by upgrading the beneficiation process. The beneficiation process can be improved by means of "more crushing and less grinding" or "less grinding and more sorting" or the like to accomplish the purpose of reducing the production cost.

Although traditional magnetic gravity separation equipment such as a magnetic separation column, an elutriation machine or the like has the considerable grade upgrading capability, the problems of entrainment of impurities and water consumption still cannot be controlled well during the sorting process. Eventually, a large amount of ores are lost in tailings when the grade of ore is increased, so that many high-grade magnetic particles are also introduced into the tailings. Moreover, because the sorting process is crude and not precise enough, it leads to large water consumption. Furthermore, such equipment has a low level of automation and needs to be maintained and adjusted by a large amount of manpower, and the disadvantages such as high loss in tailings, low recovery rate, large water consumption, and large amount of required manpower all increase the production cost of iron concentrate powder.

As described above, in order to achieve the upgrading of the beneficiation process and reduce the production cost of iron concentrate powder, there is an urgent demand for a large-scale grade upgrading equipment with low loss in tailings, high extent of grade upgrading, high recovery rate, small water consumption, and high automation degree.

SUMMARY

In order to solve the above problems, the inventors have proposed, after repeated designs and researches, a magnetic microfluidic concentrator, an intelligent magnetic microfluidic concentrator, and a complete set of beneficiation equipment, which are used in a beneficiation plant for sorting magnetic ores, and have the advantages of high extent of grade upgrading, high recovery rate, large processing capacity, low water consumption, high automation, etc.

According to a first technical solution of the present disclosure, an intelligent magnetic microfluidic concentrator is provided, which employs a technique of feeding ores circumferentially and allowing tailings to overflow centrally upward, wherein the intelligent magnetic microfluidic concentrator comprises a sorting system consisting of an ore feeding chute, an overflow chute, an overflow tank, a sorting tank, and a magnetic system, the overflow tank is disposed at an upper portion of the sorting tank, the ore feeding chute is disposed at the top of the overflow tank, the ore feeding chute feeds an ore slurry to the upper portion of the sorting tank circumferentially along an inner wall of the sorting tank, and the tailings flow out upward from the overflow tank disposed centrally and located at the upper half portion of the sorting tank.

A lower edge of the overflow tank extends into the sorting tank; the lower edge of the overflow tank is higher than the top of an inner tank, and is located in a region covered by the magnetic system; and the lower edge of the overflow tank may also extend from the bottom of a connecting pipe to a water outlet, by a range of the distance which is determined as required.

Preferably, one or more inner ore discharge ports are disposed circumferentially at an upper portion of the overflow tank, one or more outer ore discharge ports are disposed circumferentially at location(s) on a wall of the sorting tank corresponding to the inner ore discharge port(s), and the inner ore discharge port and the outer ore discharge port are connected by a connecting pipe.

Preferably, the inner ore discharge port, the outer ore discharge port, and the connecting pipe are in a rectangular shape.

A lower-edge ore outlet end of the ore feeding chute (i.e. an ore outlet end at the lower edge of the ore feeding chute) extends into the upper portion of the sorting tank; and the lower-edge ore outlet end of the ore feeding chute may also extend within a distance from an upper edge of the overflow tank to a water outlet.

Preferably, a buffer chute is disposed inside the ore feeding chute, and one or more coaxially-nested buffer enclosing plates are disposed at the outer periphery of the buffer chute. The buffer enclosing plate is provided with or without flow-through hole(s) selectively according to actual requirements, the shape and size of the flow-through hole are also set as specifically required, and the buffer enclosing plate is selectively disposed.

Preferably, the bottom of the buffer chute is flush with an upper edge of the overflow tank, or sinks into the inside of the overflow tank or is higher than an upper edge of the buffer enclosing plate. An upper sensor is disposed at the top of the sorting tank, a lower sensor is disposed on a bottom cone of the sorting tank, and a probe of the upper sensor or a communication pipe mounted thereto is inserted into the inside of the overflow tank. A water supply pipe and an ore concentrate outlet are each provided with manual, electric or pneumatic valve(s), and the valves, together with the magnetic system, a control cabinet, the upper sensor and the lower sensor, constitute an intelligent regulating system.

More preferably, both a magnetic flotation sorting technique and a magnetic fluid-control separation technique are employed for cooperative sorting. The magnetic flotation sorting technique is a sorting technique, in which a magnetic chain in the sorting tank is brought into a suspended state during the downward movement of the magnetic chain under the action of a reverse breaking magnetic field generated by the magnetic system, and at the same time the magnetic chain is broken up by a breaking magnetic field to release gangue entrained therein; and the magnetic fluid-control separation technique is a precise separation technique, in which a local micro jet flow is generated around a magnetic chain under the control of a control cabinet to strike and loosen the magnetic chain, and then the micro jet flow strikes to cause low-grade magnetic particles in a loose state to be separated from the magnetic chain.

According to a second technical solution of the present disclosure, a complete set of beneficiation equipment is provided, in which any intelligent magnetic microfluidic concentrator described above is used.

According to a third technical solution of the present disclosure, a magnetic microfluidic concentrator is provided, which employs a technique of feeding ores circumferentially and allowing tailings to overflow centrally, wherein the magnetic microfluidic concentrator comprises a sorting system consisting of an ore feeding chute, an overflow chute, an overflow tank, a sorting tank, and a magnetic system, the overflow tank is disposed at an upper portion of the sorting tank, the ore feeding chute is disposed at the top of the overflow tank, the ore feeding chute feeds an ore slurry circumferentially along an inner wall of the sorting tank, and the tailings overflow out upward from the overflow tank disposed centrally.

Further, a lower edge of the overflow tank extends into the sorting tank; the lower edge of the overflow tank extends from the bottom of a connecting pipe to a water outlet, by a range of the distance which is determined as required.

The magnetic microfluidic concentrator, the intelligent magnetic microfluidic concentrator, and the complete set of beneficiation equipment using the same disclosed in the present disclosure have the advantages of solving the disadvantage that the traditional magnetic gravity separation equipment such as a magnetic separation column, an elutriation machine or the like, although having the considerable grade improving capability, but cannot control entrainment of impurities well and consumes a large amount of water during the sorting process. Accurate sorting is achieved in the present disclosure by precisely controlling the magnetic field and water flow. Magnetic particles and impurities can be separated more effectively and precisely, resulting in ore concentrates with higher grade and higher recovery rate. Moreover, the present disclosure is highly automated and consumes a small amount of water, and can reduce more beneficiation cost for the beneficiation plant. Further, the present disclosure has a simple structure and reasonable design, fills a vacancy for such magnetic gravity separation equipment, and is worthy of wide popularization and application.

DETAILED DESCRIPTION OF EMBODIMENTS

Figure 1:
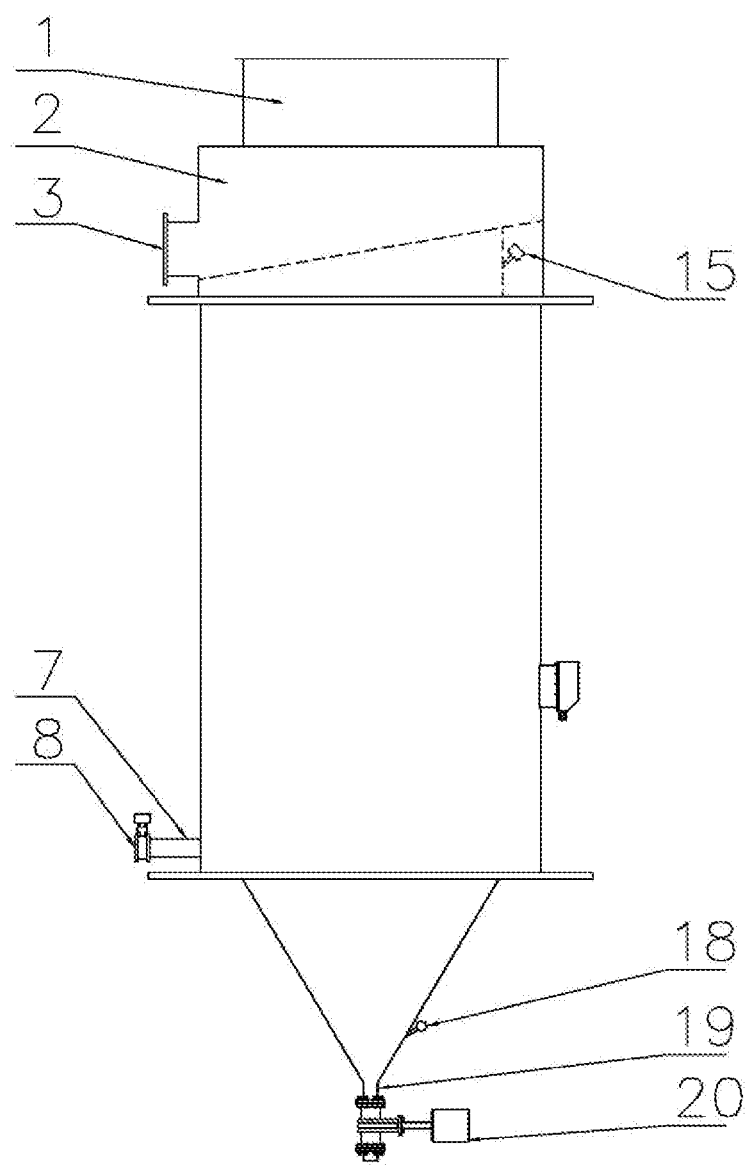
FIG. 1 is a schematic view showing the principle of an intelligent magnetic microfluidic concentrator according to the present disclosure.
Figure 2:
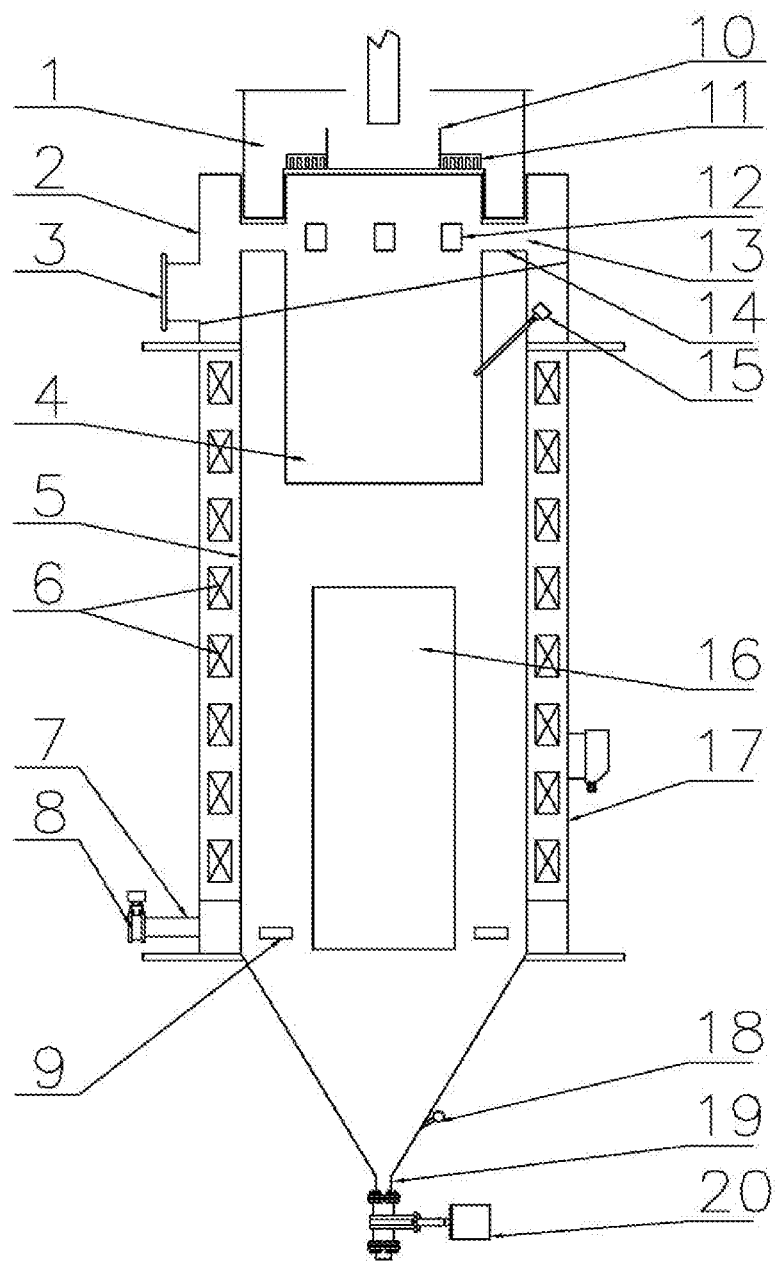
FIG. 2 is a sectional schematic view showing the structure of an intelligent magnetic microfluidic concentrator according to the present disclosure.
Figure 3:
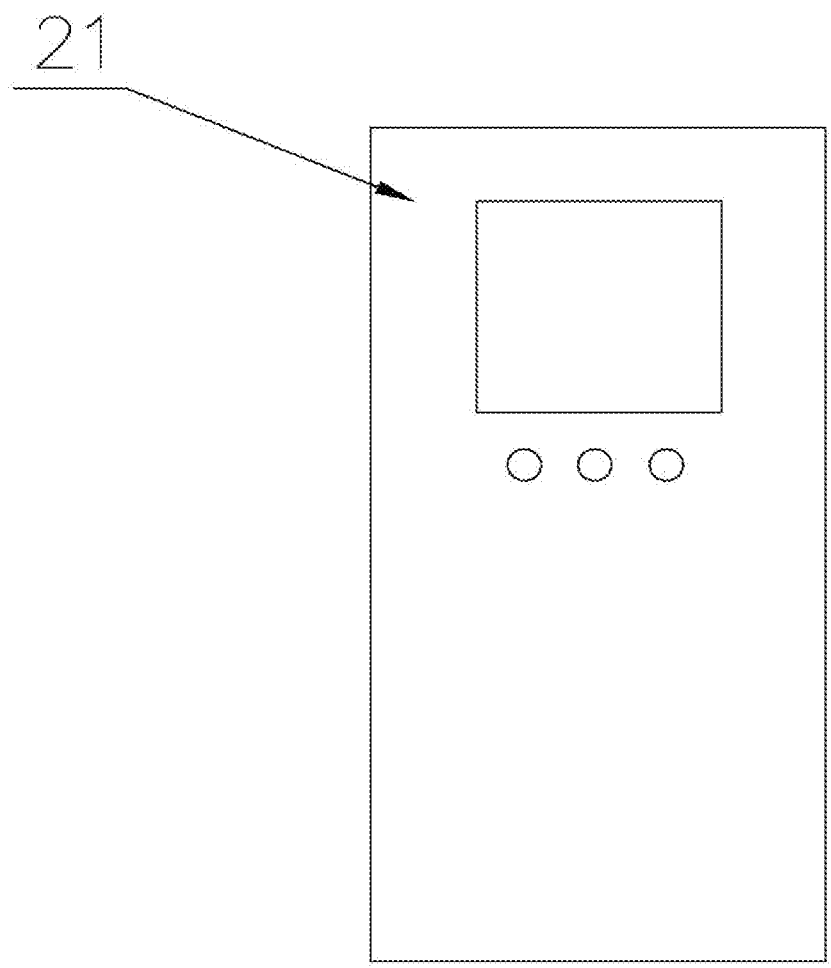
FIG. 3 is a schematic view showing the appearance of a control cabinet of an intelligent magnetic microfluidic concentrator according to the present disclosure.

The technical solutions of embodiments of the present disclosure will be described below clearly and completely with reference to the drawings of the embodiments of the present disclosure. It is apparent that the embodiments described are some, but not all of the embodiments of the present disclosure. All the other embodiments obtained by those of ordinary skill in the art in light of the embodiments of the present disclosure without inventive efforts should fall within the scope of the present disclosure as claimed. In addition, the scope of protection of the present disclosure should not be limited only to the specific structures or components or specific parameters described below.

The present disclosure discloses an intelligent magnetic microfluidic concentrator, which mainly has a sorting system consisting of an ore feeding chute 1, an overflow chute 2, an overflow tank 4, a sorting tank 5 and a magnetic system 6; and has an equipment control system, wherein an ore concentrate valve 20, a water supply valve 8, an upper sensor 15, a lower sensor 18, the magnetic system 6 disposed at the outer periphery of the sorting tank 5, and a control cabinet 21 constitute the control system. An ore slurry is fed circumferentially, near an inner wall of the sorting tank, through the ore feeding chute 1, into the equipment, along the direction of the sorting tank 5, tailings are overflowed upward from the center of the sorting tank 5 through the overflow tank 4, such that the tailings are discharged. The magnetic flotation sorting technique and the magnetic fluid-control separation technique are combined and cooperate to accomplish the function of accurate sorting. Furthermore, an influence of unstable in-field ore feeding and water supply on the sorting effect is improved by the control cabinet 21 intelligently regulating the water supply, the discharge of ore concentrate, and the magnetic field. Finally, the precise separation of magnetic particles and impurities is achieved, a high extent of grade upgrading is accomplished while ensuring a high recovery rate, the amount of water consumed by the equipment is reduced, and the purpose of automation of the equipment is achieved.

An intelligent magnetic microfluidic concentrator of the present disclosure mainly has a sorting system consisting of an ore feeding chute 1, an overflow chute 2, an overflow tank 4, a sorting tank 5, and a magnetic system 6. Water is supplied to the equipment by a water supply pipe 7. An intelligent regulating system of the intelligent magnetic microfluidic concentrator is constituted by the magnetic system 6, an upper sensor 15, a lower sensor 18, a water supply valve 8, an ore concentrate valve 20, and a control cabinet 21. During the operation in the present disclosure, an ore slurry is fed from an opening at the top of the ore feeding chute 1. The ore slurry is firstly introduced into a buffer chute 10 disposed in the ore feeding chute 1, and after being buffered by the buffer chute 10, the ore slurry overflows from an upper edge of the buffer chute 10 to the periphery. The overflowed ore slurry flows to the periphery of the ore feeding chute 1 after passing through a buffer enclosing plate 11. Then, the ore slurry is fed circumferentially downward, near an inner wall of the sorting tank, along the direction of the sorting tank 5. After the ore slurry is introduced into the sorting tank 5, high-grade ore concentrate is deposited downward and finally discharged through an ore concentrate outlet 19, while tailings overflow upward out from the overflow tank 4 disposed at the center of the sorting tank 5. Then, the tailings sequentially flow through an inner ore discharge port 12, a connecting pipe 14 and an outer ore discharge port 13 to converge to the overflow chute 2, and finally discharged by a tailing pipe 3 mounted at a side of the overflow chute 2.

Because a surface feeding method of feeding ores circumferentially and dispersedly is used to replace feeding of ores by an ore feeding pipe of the same type of equipment, an area in which ores are fed is increased by 1 time or more compared with that in the case where ores are fed by an ore feeding pipe. The ores are more highly dispersed when entering the equipment, and a distance between magnetic particles is larger than that in the case where the ores are fed by an ore feeding pipe. Because of the increase in the distance between particles, when ore concentrate particles of the ore slurry are introduced into a magnetic field and agglomerated, impurities such as non-magnetic particles and weakly magnetic particles are not easy to be entrained in the magnetic chains or agglomerations due to crowding of the particles. Moreover, when the distance between particles is larger, an acting force between the particles is smaller, and weakly magnetic particles are not easy to be attracted by strongly magnetic particles and thereby entrained in the magnetic chains or agglomerations. The finally-formed magnetic chains or agglomerations contain fewer impurities, and the formed final ore concentrate has higher grade, which is more conducive to ore sorting and solves the disadvantage that ores are not easy to be dispersed and ore concentrate is likely to have impurities when the ores are fed centrally by an ore feeding pipe.

Further, circumferential feeding of ores is used to replace the central feeding of ores in the same type of equipment. The feeding position at which ores are fed is closer to the magnetic system, where a magnetic field has higher and more uniform intensity. After the ore slurry is introduced into the magnetic field, magnetic chains or agglomerations formed by agglomerating magnetic particles have more uniform size. The problem is solved that when ores are fed centrally, the point at which the ores are fed is just located at a region non-magnetic field generated by the magnetic system, thus magnetic particles are not sufficiently agglomerated, magnetic chains or agglomerations formed by the magnetic particles with the same magnetism have different sizes, and thus the sorting is not accurate, and the ore concentrate is upgraded to a low extent, magnetic is easily lost in the tailings, and has a low recovery rate.

Further, in a vertical direction, the arrangement in which ores are fed to the middle of the sorting tank 5 in the same type of equipment is replaced by the arrangement of feeding the ore slurry to the top of the sorting tank 5 by the ore feeding chute 1 disposed at the top of the sorting tank 5 in the present disclosure. A route (distance) for sorting of the ore slurry from top to bottom is increased. The process of sorting the ore slurry is a process for separating internal useful magnetic materials from non-magnetic impurities and weakly magnetic impurities, and the process for separating the three substances requires enough time. If the time is too short, they may be separated incompletely, resulting in the problem that final ore concentrate contains impurities and has low grade improving extent. According to the solution of the present disclosure in which the ore feeding chute 1 is disposed at the top of the sorting tank 5, the sorting route is increased, and thereby the sorting time is increased, which provides enough time for the impurities to be completely separated from magnetic chains or magnetic agglomerations, ensuring the sorting index and the stability of the sorting.

Further, a technical solution is employed in the present disclosure, in which tailings flows upward and discharged by the overflow tank 4 disposed at the center of the sorting tank 5, and the tailings are overflowed from the upper portion of the overflow tank 4 to the periphery. Water inside the overflow tank 4 flows upward, oppositely to a direction in which magnetic chains or agglomerations formed by strongly magnetic particles are sedimented. This solution can be implemented to not only flush away the non-magnetic impurities or weakly magnetic impurities in the ore slurry upwards, but also enable the magnetic chains or agglomerations formed by the strongly magnetic particles to be sedimented downward to form the final ore concentrate, whereby the separation function is finally accomplished. Further, the overflow tank 4 is disposed inside the sorting tank 5. The overflow tank 4 has a reduced cross-sectional area therein, so that the speed of water flowing upward is increased, increasing an impulsive force applied to the impurities, and solving the disadvantage that large-particulate tailings fall back to the sorting tank 5 again when overflowing outward, resulting in the mixing of the large-particulate tailings into the ore concentrate so that the grade of the ore concentrate is lowered.

Further, both the magnetic flotation sorting technique and the magnetic fluid-control separation technique are employed in the present disclosure for cooperative sorting. After the minerals (ores) are introduced into the sorting tank 5, gangue entrained in magnetic chains is released by the magnetic flotation sorting technique, so that the magnetic chains in which no gangue is entrained are deposited downward, and then magnetic particles with a grade lower than the desired grade are separated from the gangue-free magnetic chains by the magnetic fluid-control separation technique, and finally the magnetic particles with the grade lower than the desired grade and the gangue are introduced into the overflow tank 4 together to form tailings and then discharged, whereby the effect of accurate grade upgrading is achieved while ensuring a high recovery rate, and moreover the sorting is performed in a more accurate and more water-saving manner. The magnetic flotation sorting technique refers to a sorting technique, in which a magnetic chain in the sorting tank 5, during downward movement, is brought into a suspended state under the action of a reverse breaking magnetic field generated by the magnetic system 6, and at the same time the magnetic chain is broken up by the breaking magnetic field to release the gangue entrained therein.

The magnetic fluid-control separation technique described in the present disclosure refers to a precise separation technique, in which a local micro jet flow is generated around a magnetic chain under the control of the control cabinet 21 to strike and loosen the magnetic chain, and then the micro jet flow strikes to cause low-grade magnetic particles in a loose state to be separated from the magnetic chain. This is a technique unique to the present disclosure. It cooperates with the structural technical solution and the sorting solution employed in the present disclosure to solve the disadvantages of traditional equipment such as inaccurate sorting, low extent of grade upgrading of ore concentrate, and low recovery rate. Moreover, the disadvantage of large water consumption in the traditional equipment is solved by means of accurate control.

Further, the present disclosure is described in detail with reference to the accompanying drawings. An intelligent magnetic microfluidic concentrator mainly has a sorting system consisting of an ore feeding chute 1, an overflow chute 2, an overflow tank 4, a sorting tank 5, and a magnetic system 6, wherein the sorting system is supplied with water by a water supply pipe 7; and its intelligent regulating system is constituted by the magnetic system 6, an upper sensor 15, a lower sensor 18, a water supply valve 8, an ore concentrate valve 20, and a control cabinet 21.

Preferably, the ore feeding chute 1 is disposed at the uppermost end of the present disclosure and located at the top of the overflow tank 4. An ore outlet end at a lower edge of the ore feeding chute 1 extends into an upper portion of the sorting tank 5. Based on the technical solution involving the preferable position of the ore feeding chute 1 in the present disclosure, the ore outlet end at the lower edge of the ore feeding chute 1 extends into the sorting tank 5 by a distance from an upper edge of the overflow tank 4 to a water outlet 9, which is included within the scope of protection of the present disclosure.

Preferably, a buffer chute 10 is disposed in the ore feeding chute 1, and a buffer enclosing plate 11 is disposed at the outer periphery of the buffer chute 10. Further, preferably, the bottom of the buffer chute 10 is at the same height as the upper edge of the overflow tank 4. That the bottom of a buffer chute 10 sinks to the inside of the overflow tank 4 or is higher than the upper edge of the overflow tank 4, obtained based on the present solution, is included within the scope of protection of the present disclosure. A buffer enclosing plate 11 is disposed at the outer periphery of the buffer chute 10, preferably, the buffer enclosing plate 11 is provided with a flow-through hole, and the shape and number of the flow-through holes are set as required. Provision of no flow-through hole based on the present solution is also included within the scope of protection of the present disclosure.

The technical solution of the present disclosure has its special advantages, wherein in the technical solution, a buffer chute 10 is disposed in the ore feeding chute 1 and a buffer enclosing plate 11 is disposed at the outer periphery of the buffer chute 10. The buffer chute 10 may be disposed to buffer an ore slurry entering the equipment, so that the ore slurry flows out from the buffer chute 10 in an overflow manner. The overflow manner can not only greatly reduce the flow speed of the ore slurry entering the equipment, but also enable the ore slurry to be distributed more uniformly along the circumference, so that the stability of the operation of the equipment can be improved. Moreover, after the ore slurry is buffered and overflowed via the buffer chute 10, the overflowing ore slurry is further slowed down and distributed uniformly via the buffer enclosing plate 11, whereby the stability and uniformity of the ore slurry introduced into the inside of the equipment are ensured.

Based on the preferable technical solution of the ore feeding chute 1 of the present disclosure, an ore feeding chute that is not provided with the buffer chute 10 and the buffer enclosing plate 11 or that is provided with a plurality of buffer chutes 10 and buffer enclosing plates 11 is included within the scope of protection of the present disclosure. At different locations in the ore feeding chute 1, wear-resistant treatment may be performed or wear-resistant treatment may not be performed.

The overflow tank 4 is disposed coaxially at the upper half portion of the sorting tank 5, and in a preferable solution, a lower edge of the overflow tank 4 is higher than the top of an inner tank 16, and is located in a region covered by the magnetic system 6. Based on the preferable solution, the lower edge of the overflow tank 4 extends into the sorting tank 5 within a depth range from a lower edge of the connecting pipe 14 to the water outlet 9, which is included within the protection scope of the present disclosure.

One or more inner ore discharge ports 12 are disposed circumferentially at the upper portion of the overflow tank 4, one or more outer ore discharge ports 13 are disposed circumferentially at location(s) on the sorting tank 5 corresponding to the inner ore discharge port(s) 12, and a connecting pipe 14 is disposed between the inner ore discharge port 12 and the outer ore discharge port 13 for connection therebetween. The shape of each of the inner ore discharge port 12, the outer ore discharge port 13 and the connecting pipe 14 is preferably a rectangle, but is not limited to a rectangle. An overflow chute 2 is disposed at the upper portion of the outer periphery of the sorting tank 5 for collecting and discharging the tailings discharged from the outer ore discharge port 13. Preferably, the ore feeding chute 1, the sorting tank 5, the overflow tank 4, and the overflow chute 2 are employed in the present disclosure to carry out the function of circumferentially feeding the ores along the inner wall of the sorting tank 5 at the top of the sorting tank 5 and allowing the tailings to overflow upward centrally from the center of the sorting tank 5. It is not limited to the structural solution employed in the present disclosure, and any beneficiation equipment employing an ore feeding method in which the ores are fed circumferentially and a tailing discharge method in which the tailings are overflowed upward centrally is included within the scope of protection of the present disclosure.

An upper sensor 15 is disposed at the top of the sorting tank 5, and a lower sensor 18 is disposed on the bottom cone of the sorting tank 5. The upper sensor 15 is used for detecting parameters inside the overflow tank 4, therefore a probe of the upper sensor 15 or a communication pipe mounted thereto needs to be inserted into the inside of the overflow tank 4. The water supply pipe 7 and the ore concentrate outlet 19 are each provided with a valve, and the valve may be a manual, electric or pneumatic adjusting valve or the like. The valves, together with the magnetic system 6, the control cabinet 21, the upper sensor 15 and the lower sensor 18, constitute an intelligent regulating system of the present disclosure. The degree of opening of each valve and the intensity and gradient of the magnetic field generated by the magnetic system 6 at different location inside the sorting tank 5 are adjusted by the intelligent regulating system. The magnetic flotation sorting technique and the magnetic fluid-control separation technique as well as an organic cooperation of the two techniques are achieved. Moreover, an intelligent adjustment may be made for change of the in-field ore feeding and water supply. Further, an external tank 17 is disposed outside the magnetic system 6 for protecting the magnetic system 6.

Still further, according to a variation of the technical solution of the present disclosure, a magnetic microfluidic concentrator employs a technique of feeding ores circumferentially and allowing tailings to overflow centrally. The magnetic microfluidic concentrator comprises a sorting system consisting of an ore feeding chute 1, an overflow chute 2, an overflow tank 4, a sorting tank 5, and a magnetic system 6, the overflow tank 4 is disposed at an upper portion of the sorting tank 5, the ore feeding chute 1 is disposed at the top of the overflow tank 4, the ore feeding chute 1 feeds an ore slurry circumferentially along an inner wall of the sorting tank 5, and tailings overflow upward from the overflow tank 4 disposed centrally. Further, a lower edge of the overflow tank 4 extends into the sorting tank 5; and the lower edge of the overflow tank 4 extends within a depth range from the bottom of the connecting pipe 14 to the water outlet 9, and the specific distance is determined as required.

In the present disclosure, the ore slurry is fed into the sorting tank 5 in such a manner that the ores are fed circumferentially, and the tailings are discharged from the sorting tank 5 in such a manner that the tailings overflow upward centrally. Water is introduced into the sorting tank 5 from the water outlet 9 and flows upward to form a counter flow with respect to the ore concentrate deposited downward so as to flush out the tailings upward. The magnetic flotation sorting technique and the magnetic fluid-control separation technique are employed and cooperate with each other to accurately sort the minerals. Finally, the precise separation of magnetic particles and impurities is accomplished, and the problems are solved that the traditional equipment performs a rough sorting, consumes a large amount of water, can hardly achieve an ideal grade of ore concentrate while ensuring a high recovery rate, and has a low degree of automation.

The above description is merely illustrative of preferred specific embodiments of the present disclosure, but the scope of protection of the present disclosure is not limited thereto, and any variations or alternatives that would readily occur to those skilled in the art within the technical scope disclosed in the present disclosure should be encompassed in the scope of protection of the present disclosure. It will be understood by those of ordinary skill in the art that various modifications may be made in form and detail without departing from the spirit and scope of the present disclosure as defined by the appended claims.

The invention claimed is:

1. A magnetic microfluidic concentrator for feeding circumferentially ores and allowing tailings to overflow centrally upward, wherein the magnetic microfluidic concentrator comprises:
    a sorting system consisting of an ore feeding chute, an overflow chute, an overflow tank, a sorting tank, and a magnetic system;
    wherein the overflow tank is disposed at an upper portion of the sorting tank,
    the ore feeding chute is disposed at a top of the overflow tank,
    the ore feeding chute is configured to feed an ore slurry to the upper portion of the sorting tank circumferentially along an inner wall of the sorting tank,
    and the tailings flow out upward from the overflow tank which is disposed centrally and located at an upper half portion of the sorting tank, wherein a lower edge of the overflow tank extends into the sorting tank;
    and the lower edge of the overflow tank is higher than a top of an inner tank, and is located in a region covered by the magnetic system.

2. The magnetic microfluidic concentrator according to claim 1, wherein the lower edge of the overflow tank extends from a bottom of a connecting pipe to a water outlet, by a distance.

3. The magnetic microfluidic concentrator according to claim 1, wherein one or more inner ore discharge ports are disposed circumferentially at an upper portion of the overflow tank, one or more outer ore discharge ports are disposed circumferentially at one or more locations on a wall of the sorting tank corresponding to the one or more inner ore discharge ports, and the magnetic microfluidic concentrator further comprises one or more connecting pipes, and each inner ore discharge port is connected with one corresponding outer ore discharge port by one connecting pipe.

4. The magnetic microfluidic concentrator according to claim 3, wherein the one or more inner ore discharge ports, the one or more outer ore discharge ports, and the one or more connecting pipes are each in a rectangular shape.

5. The magnetic microfluidic concentrator according to claim 1, wherein a lower-edge ore outlet end of the ore feeding chute extends into the upper portion of the sorting tank.

6. The magnetic microfluidic concentrator according to claim 5, wherein the lower-edge ore outlet end of the ore feeding chute extends by a distance, from an upper edge of the overflow tank to a water outlet.

7. The magnetic microfluidic concentrator according to claim 1, wherein a buffer chute is disposed inside the ore feeding chute, and one or more buffer enclosing plates are disposed at an outer periphery of the buffer chute, with the one or more buffer enclosing plates coaxially nested.

8. The magnetic microfluidic concentrator according to claim 7, wherein each of the one or more buffer enclosing plate is provided with a flow-through hole.

9. The magnetic microfluidic concentrator according to claim 7, wherein a bottom of the buffer chute is flush with an upper edge of the overflow tank, or sinks into an inside of the overflow tank or is higher than an upper edge of each of the one or more buffer enclosing plates.

10. The magnetic microfluidic concentrator according to claim 1, wherein an upper sensor is disposed at a top of the sorting tank, a lower sensor is disposed on a bottom cone of the sorting tank, and a probe of the upper sensor or a communication pipe mounted thereto is inserted into an inside of the overflow tank.

11. The magnetic microfluidic concentrator according to claim 1,
    further comprises a control cabinet, an upper sensor and a lower sensor wherein a water supply pipe and an ore concentrate outlet are each provided with a manual, electric or pneumatic valve,
    and the valves, together with the magnetic system, the control cabinet, the upper sensor and the lower sensor, constitute a regulating system.

12. The magnetic microfluidic concentrator according to claim 1, wherein the magnetic system is configured to implement magnetic flotation sorting, and the magnetic microfluidic concentrator further comprises a control cabinet configured to implement magnetic fluid-control separation.

13. A magnetic microfluidic concentrator, which employs a technique for feeding circumferentially ores and allowing tailings to overflow centrally, wherein the magnetic microfluidic concentrator comprises a sorting system consisting of an ore feeding chute, an overflow chute, an overflow tank, a sorting tank, and a magnetic system, the overflow tank is disposed at an upper portion of the sorting tank, the ore feeding chute is disposed at a top of the overflow tank, the ore feeding chute is configured to feed an ore slurry circumferentially along an inner wall of the sorting tank, and the tailings overflow out upward from the overflow tank disposed centrally,
    wherein a lower edge of the overflow tank extends into the sorting tank; and the lower edge of the overflow tank is higher than a top of an inner tank, and is located in a region covered by the magnetic system.

14. The magnetic microfluidic concentrator according to claim 13, wherein the lower edge of the overflow tank extends from a bottom of a connecting pipe to a water outlet, by a distance.

* * * * *